US008255524B2

(12) United States Patent
Devitt

(10) Patent No.: US 8,255,524 B2
(45) Date of Patent: Aug. 28, 2012

(54) ARRANGEMENT AND A METHOD RELATING TO PERFORMANCE MONITORING

(75) Inventor: Ann Devitt, Dublin (IE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/530,161

(22) PCT Filed: Mar. 8, 2007

(86) PCT No.: PCT/EP2007/052168
§ 371 (c)(1),
(2), (4) Date: Sep. 4, 2009

(87) PCT Pub. No.: WO2008/107020
PCT Pub. Date: Sep. 12, 2008

(65) Prior Publication Data
US 2010/0077077 A1    Mar. 25, 2010

(51) Int. Cl.
*G06F 15/173* (2006.01)
(52) U.S. Cl. .......................... 709/224; 709/230; 709/246
(58) Field of Classification Search .................. 709/224, 709/230, 246
See application file for complete search history.

(56) References Cited

U.S. PATENT DOCUMENTS

| 2003/0079160 A1 | 4/2003 | McGee et al. |
| 2006/0200333 A1 | 9/2006 | Dalal et al. |

FOREIGN PATENT DOCUMENTS

WO    2008/067852 A1    6/2008

OTHER PUBLICATIONS

PCT International Search Report, mailed Apr. 3, 2008, in connection with International Application No. PCT/EP2007/052168.
Jensen, F. V. "Bayesian Networks and Decision Graphs" Chapter 1, pp. 1-34, Springer-Verlag, 2001.
Strassner, J. "Policy-Based Network Management—Solutions for the Next Generation" Chapter 1, pp. 1-38, Elsevier, 2004.

*Primary Examiner* — Adnan Mirza
(74) *Attorney, Agent, or Firm* — Potomac Patent Group PLLC

(57) ABSTRACT

The present invention relates to an arrangement for monitoring performance in a network comprising a number of network devices or nodes, services and users, in real-time. The arrangement comprising information collecting means, generating means for generating performance KPI indicators depending on a number of definition performance parameters for one or more of said network nodes. The generating means comprise or communicate with decision graph generating means adapted to generate decision graph structures representing respective KPI values and combination probabilities in dependence of KPI definition performance parameters and in dependence of additional or correlation parameters. The generating means comprise decision graph content updating means adapted to update the decision graph structure or structures using said collected information to enable prediction of KPI status/behavior and message sending means are provided which are adapted to send out messages or notifications relating to one or more prediction results.

6 Claims, 6 Drawing Sheets

ARRANGEMENT AND A METHOD RELATING TO PERFORMANCE MONITORING

TECHNICAL FIELD

The present invention relates to an arrangement for monitoring performance of a network comprising a number of network devices or nodes, services and users, in real-time. The invention also relates to a method for monitoring performance of a network.

BACKGROUND

Networks generally become increasingly heterogeneous and complex. Most likely future networks will be service-driven and the user will expect constant service availability on any network to which the user has access. Such networks normally will consist of a large variety of different access networks and core networks and they will be required to offer many services simultaneously. In addition thereto they will exhibit a much more dynamic behaviour than current networks do in order to be able to substantially in real-time, adapt to end user needs for best quality of experience (QoE) and operator needs for optimal resource management at reasonable operator expenditure (OPEX). These factors make network management complicated and the requirements and the expectations that network operators are able to offer (user-centric, end-to-end, always-best connectivity) become high. Particularly it requires network management systems which are complex, distributed and to a large extent adaptive to changes in the network. This among others drives the development towards policy-based network management which is adapted to deploy expert knowledge in the network regarding services, interaction between services, user preferences and strategic views of business to allow the network to make decisions on how to manage these services in a dynamic, heterogeneous multi-service environment.

Policy-based network management is for example discussed in "Policy-Based Network Management: Solutions for the Next Generation": ELSEVIER, 2004, by J. Strassner.

In any distributed self-managed network, for example driven by policies, the devices of the network exhibit individual behaviour in order to fulfill a service and/or user requirements. This individual behaviour will affect the network as a whole. Therefore it becomes crucial to be able to observe the behaviour of the network for purposes such as forecasting and detection of undesired behaviour, malfunctioning etc. In order to be able to monitor the behaviour of the network, composed of network devices, services and users, the management system must monitor events relevant to the network as well as the status of the network. In order to be useful the management system should infer both how and what the network is doing (events relevant to the network) and how this impacts the status of the network. Ideally, the management system should extrapolate what may happen in the network based on knowledge about what has happened in the network in the past. For this purpose so called Key Performance Indicators (KPI) and Key Quality Indicators are used which describe how network operators evaluate the efficiency and effectiveness of their exploitation of existing network resources. These indicators can be based on a single performance parameter such as number of missed calls on a network device or in a network. They can also be based on complex equations involving multiple network parameters.

Network device KPIs are calculated for individual network devices and indicate the performance of the respective devices. Network level KPIs are based on aggregations of network device KPIs or other measurements based on specified formulae and are indicators of the overall performance of the network as a whole.

Traditionally key performance indicators have been calculated on the basis of historically recorded data on a regular basis. These historical KPIs have been used to determine how well the network was performing its functions in the past and to retrospectively identify problems that may have occurred in the past. Operators set threshold levels for adequate KPI performance. A KPI is violated when it drops below the specified threshold resulting in poor performance on the device or in the network.

It is possible to, in retrospective reports, establish dips in a graph indicating KPI violations. For an operator it then becomes possible to identify that on for example particular days the network have been under-performing. To identify what caused the performance degradations on those days, the operator has to revert to for example call data records, alarm logs and trouble ticket logs. Such historical KPI calculation and presentation has been widely used in various network management solutions. There are many tools which perform such a function with varying degrees of elegance, efficiency and automation. In recent times, the functionality to monitor key performance indicators in real-time are highly demanded from network operators. Today some tools exist which provide real-time key performance indicator monitoring which in turn allows users to define new KPI formula, KPI violation threshold, to set up alarms and to present the current status of KPIs.

However, with the existing tools it is only possible to react to performance degradations that have already occurred. Such retrospective approaches are clearly unsatisfactory since they leave no possibility to operators to respond to KPI violations in a timely manner. The only possible reactions at such a late stage consist in trying to identify the root cause of a violation which is a very onerous task and entirely relies on experts in order to prevent problems recurring, and, for managed service operations, e.g. to pay penalty fees for any past violations. Such solutions are clearly unsatisfactory.

SUMMARY

It is therefore a general object of the present invention to improve network performance monitoring. It is particularly an object of the invention to provide for an arrangement enabling monitoring, analysis of and reaction to KPI behaviour in real-time. More particularly it is an object of the present invention to provide a functionality enabling prediction of KPI degradations and to provide a solution through which operators are given the possibility to pro-actively prevent KPI degradations before they actually occur. It is also an object to provide an arrangement which allows an operator to respond to KPI violations in a timely and efficient manner.

Particularly it is an object of the present invention to provide an arrangement through which it becomes easier to determine the cause of the degradation of the performance, particularly as indicated by the KPI value. Most particularly it is an object of the invention to suggest an arrangement through which a root cause analysis can be carried out in an easier, more efficient and faster manner than hitherto and to a lesser extent relying on experts than known arrangements.

It is also an object of the present invention to provide a method through which one or more of the above mentioned objects can be achieved.

Most particularly it is an object of the invention to provide an improved arrangement for monitoring of self-managed or policy driven networks.

Therefore an arrangement as initially referred to is provided which comprises generating means for generating and presenting performance KPI definition indicators depending on a number of performance parameters for one or more of said network devices, and/or for the network. The generating means comprise or communicate with graph generating means adapted to generate one or more decision graph structures representing the respective KPI values and combination probabilities in dependence of KPI definition performance parameters and additional or correlation parameters. The generating means comprise decision graph content updating means adapted to update the decisions graph parameters using collected information, enabling prediction of KPI status or KPI behaviour. By status is here meant the value at a single point in time, e.g. at any given point in time or current value. By behaviour is here meant variation during a given time interval, changes over a given time interval. It can be done for KPI and/or individual performance parameters, e.g. performance counters. The status is hence static and behaviour relates to how the KPI value has been, or is, moving or behaving. Predicting behaviour comprises predicting if the KPI value and/or individual performance parameters will go up or down or what pattern it will follow for a time period. Message sending means are also provided which can send out messages or notifications.

The invention therefore also provides a method for real-time monitoring performance in a network comprising a number of network devices or nodes, services and users, which method comprises the steps of; generating or providing one or more key performance indicators (KPI) in dependence of KPI definition performance parameters and in dependence of additional or correlation parameters as a decision graph; updating automatically the KPIs when there is a change in any definition performance parameter and/or in any additional or correlation parameter so that the KPI values and combination probabilities always are up-to-date, using the decision graph to predict KPI and/or performance behaviour.

It is an advantage of the solution according to the present invention that it allows operators to proactively prevent KPI degradation or performance degradation before it actually occurs. It is also an advantage that monitoring in real-time of service performance of a network is facilitated and that it becomes possible to predict and analyse service performance in real-time.

It is also an advantage of the inventive concept that it facilitates monitoring of key performance indicators in real-time. It is still further an advantage that it becomes easier to identify the root cause of a violation. Most particularly it is an advantage that it becomes possible to actually predict KPI degradations such that relevant actions can be taken and that it becomes possible to attack a problem at the source even before the problem has had a chance to occur.

It is also an advantage of the invention that the needs for an expert to analyse monitoring results and to take the relevant measures are reduced, and to the extent an expert actually is needed, relieves his/her tasks. It is particularly an advantage that the costs incurring an operator for KPI violations can be considerably reduced.

BRIEF DESCRIPTION OF THE DRAWINGS

The invention will in the following be more thoroughly described, in a non-limiting manner, and with reference to the accompanying drawings, in which.

DETAILED DESCRIPTION

Figure 1:
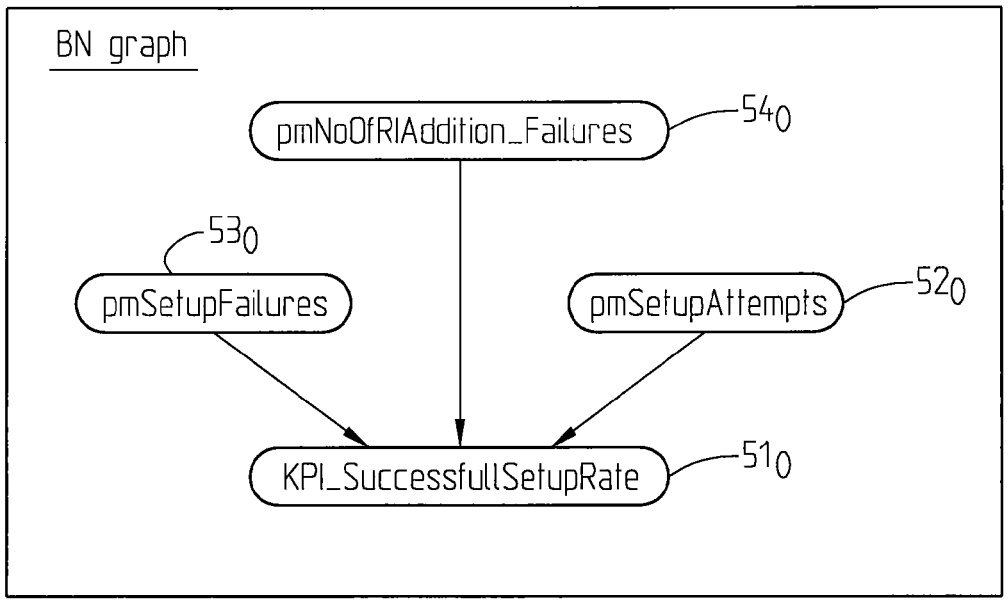
FIG. 1 shows an example of a BN (Bayesian Network) graph representing KPI and its definition performance counters.

The present invention particularly suggests a performance monitoring arrangement wherein Decision Graph structures comprising extended Bayesian Networks are derived by using, in a preferred implementation, the inference or reasoning capabilities offered by formal ontologies relying on for example Description Logics and/or Frame Logics. Expert knowledge is in particular embodiments assumed to be represented in formal ontologies. The diverse inference or reasoning capabilities of formal ontologies may be used to create a structure of a Decision Graph model to derive causal relationships between graph nodes and predict behaviour. The patent application "Arrangement And Method For Network Management" filed on Dec. 7, 2006 by the same applicant describes an arrangement for network management wherein ontologies are used as a knowledge source. The content thereof is herewith incorporated herein by reference.

Ontologies are a means of providing a structured representation of knowledge, from the generic real world to strictly domain-specific knowledge. By using an ontological representation, concepts in a given domain can be captured in order to provide a shared common understanding of the domain, enabling interoperability and knowledge reuse in addition to machine-readability and reasoning about information through inferencing. Ontologies are deterministic and consist of concepts and facts about a domain and their relationships to each other. Bayesian Networks are a means of estimating complex probabilities of states based on graphical models of a domain. They are furthermore a structured representation of knowledge and specify the relationships between concepts (or variables) of a domain. These relationships denote the dependencies and interdependencies that hold between the concepts or variables. They are probabilistic. Thus the knowledge representation and inference capabilities of ontologies can be used to automatically construct a Decision Graph model, particularly an extended Bayesian Network. The ontology model is designed to provide a self-configuring functionality facilitating automation of configuration workflows and it particularly serves as a repository of knowledge for the construction of a machine learning extended Bayesian Network component. The extended Bayesian Network component in turn is designed to provide the adaptive functionality, monitoring and learning the effects of configuration actions and closing a feedback loop on management activity.

Thus, as referred to above the generating means are adapted to generate or at least update one or more decision graphs, each comprising an extended Bayesian Network. The means generating the structure or shape of the decision graph may be located in the generating means, or be in communication therewith. By generating means are here meant both the decision graph generating means provided externally of or in the arrangement for performance monitoring, and the updating means, included in the arrangement. This means that a "pre-fabricated" graph structure may be used or the graph structure may be generated "on site", in the arrangement, e.g. in a device or node to be monitored, or at a central location.

A Bayesian Network (BN) consists of a Directed Acyclic Graph (DAG) structure. The nodes of the graph represent variables from an application domain, for example performance counters in a telecommunications network. Ontologies represent knowledge in terms of concepts and relations. Ontological concepts, in terms of a Bayesian Network, are domain variables which can take certain values and have an associated probability distribution which is represented as nodes in the BN graph. The arcs in the graph normally represent the dependencies that hold between variables, often a causal relationship.

Most particularly the decision graph comprises a Bayesian Network adapted to be extended with evaluation means adapted to enable a qualitative state evaluation of KPI values and combination probabilities and KPI behaviour, and decision means adapted to enable decision making based on said state evaluation of said performance variables. In one embodiment the extended Bayesian Network comprises a DAG comprising a number of nodes representing said KPI definition performance parameters and extended with a number of utility nodes comprising said evaluation means and a number of decision nodes comprising said decision means. Said decision nodes or decision means are most particularly adapted to use the evaluations performed by said utility nodes to trigger one or more actions. The utility node is most particularly adapted to encode the qualitative evaluation of a generated KPI value with respect to a given threshold value. One or more threshold values may be given relating to one or more of KPI violation and a certain risk of KPI violation. The performance parameters may, but do not have to, be operator defined. Furthermore one or more of said threshold values may also be operator defined, although they do not have to.

The performance parameters particularly comprise performance counters. The additional or correlation parameters may comprise one or more of alarm, configuration action, KPI definition or external performance counters. In a preferred implementation a conditional probability distribution over the performance parameters (or variables) is provided which is adapted to encode the probability that the performance parameters (variables) assume different values when specific values are given for other performance variables or parameters. In one particular embodiment the arrangement is adapted to receive the probability distribution on-line although there are also other ways to provide it, for example it may be provided by an expert, or learnt off-line e.g. from historical data.

Each KPI particularly comprises a formula depending on a number of performance parameters (variables), particularly performance counters. Particularly the arrangement comprises storing means for storing one or more decision graph models, for a single KPI or a number of KPIS.

Particularly the arrangement is adapted to update automatically the values of the performance variables or parameters of KPI and the other parameters or variables when there is a change in one variable or parameter, thus automatically updating the current status of the respective KPI (as well as all other parameters). Particularly it is adapted to generate an action, when an operator defined threshold value is, or is predicted to be, reached or exceeded. This action comprises a notification or an alarm, and identification of the variables in the decision graph having contributed to the KPI value reaching/passing the threshold value or being predicted to do so. The decision graph particularly comprises a plurality of KPIs performance variables, additional performance variables, configuration services and utility and notification decision nodes. The utility node is particularly adapted to assign a value to each quality evaluation based on parameter (variable) value and decision combinations. The arrangement particularly comprises calculating means adapted to establish how a value of a node for a variable or a KPI varies upon variation of other or relevant definition performance parameters and additional performance parameters to perform a sensitivity analysis. The calculating means may also be adapted to establish how the value of a KPI varies depending on variation of additional performance parameter values to perform a root cause analysis of predicted or actual reaching of predefined threshold values relating to KPI violations by establishing which other node or nodes in the decision graph has/have the strongest influence on the KPI node.

In one implementation the decision graph comprises a local decision graph for a network device and the arrangement, possibly without the decision graph (structure) generating means, which may be external as an alternative to internal, is adapted to be provided in or associated with said network device for distributed network management. In an alternative implementation the decision graph comprises a global decision graph for a number of network level KPIs and it is then adapted to be provided at a central location in the network, for centralized network management monitoring.

Corresponding alternative or optional advantageous implementations or features are also provided for the method although in terms of corresponding methods steps.

The arrangement or the method may be implemented in/for generally any node requiring to be managed or with advantage being managed such as a radio access network node, for example an RBS (Radio Base Station), an RNC (Radio Network Controller), or more generally a router which may be wireless or not, a mobile terminal, for example a PDA (Personal Digital Assistant) etc. Performance monitoring according to the present invention may also be implemented on network level.

A Bayesian Network comprises as referred to above, a DAG structure with nodes representing statistical variables such as performance counters and the arcs represent the influential relationships between these nodes. In addition thereto there is an associated conditional probability distribution over said statistical variables, for example performance counters. The conditional probability distribution encodes the probability that the variables assume their different values given the values of other variables in the BN. According to different embodiments the probability distribution is assigned by an expert, learnt off-line from historical data or learnt on-line incrementally from a live feed of data. Most preferably the probabilities are learnt on-line on the network devices.

According to the present invention the graph generating means are adapted to generate Decision Graph structures. Decision Graphs are among other things described in "Bayesian Networks and Decision Networks", by F. B. Jensen, Springer-Verlag, 2001. A Decision Graph consists of the same elements, DAG and conditional probability distribution tables, as a BN and in addition thereto include a qualitative evaluation of the states which the BN represents and a means of taking decisions based on the evaluation of the states. According to the present invention the additional functionalities of the decision graphs as compared to Bayesian Networks, are realised by means of two additional node types in the BN DAG. One of these node types comprise utility nodes which are adapted to provide a qualitative evaluation of the decision graph variables to which they are connected, indicating the goodness or badness of different decision graph states. The other additional node type is a decision node which is adapted to trigger actions, such as for example sending an alert, an alarm or a notification on the basis of the qualitative evaluation performed by the utility nodes.

FIG. 1 schematically illustrates a representation of a KPI and associated performance counters in a Bayesian Network. A KPI is a formula based on a single or on multiple counters which are collected for given network devices. BNs provide a functionality to encode such a formula directly in the graph. The node 510 which represents a KPI in the BN graph is linked to the nodes 550, 530, 540 representing the counters of which the KPI formula is composed. Links indicate causal relationships between changes to counters and to the KPI. In addition to this basic causal relation, the BN provides the functionality to define exactly the formula by which the causality is imposed, i.e. the KPI formula itself. In FIG. 1 the nodeSetupRate 510 KPI shows a causal connection between the counters PMSetupAttempts 520, PMSetupFailures 530 and AdditionalFailures 540 and the KPI itself. The KPI node 510 specifies how these counters contribute to the KPI value, here according to the following formula:

$$SuccessfulSetupRate = \left(\frac{(pmSetupFailures + pmNoOfRIAdditionalFailures)}{pmSetupAttempts}\right) \times 100$$

With such a traditional BN representation of a KPI, it is possible to track the current value of a KPI and determine the probabilities for the KPI having given values.

According to the present invention an arrangement and a method respectively for monitoring, predicting and analysing KPI behaviour in real-time is provided which uses decision graphs. Basically the invention can be said to comprise modelling KPIs, their attendant parameters (performance variables) and other events of interest, such as alarms, as a Decision Graph including assigning a qualitative evaluation of the values of the KPI, and storing the relevant Decision Graph model on each network device concerned and/or in the network. Further it comprises automatic updating of the current status of the KPIs for a network device by updating the values of respective attendant parameters or performance variables in the BN on that network device, and enables generation of a notification or an alarm, to take an action, where the probability of a "bad" KPI value is high. In a preferred embodiment, in the event of a KPI violation or predicted near-KPI violation, the inventive concept comprises identifying the key variables in the Decision Graph model which contributed most to this violation. This however relates to an advantageous implementation to which the inventive concept is not limited.

Figure 2:
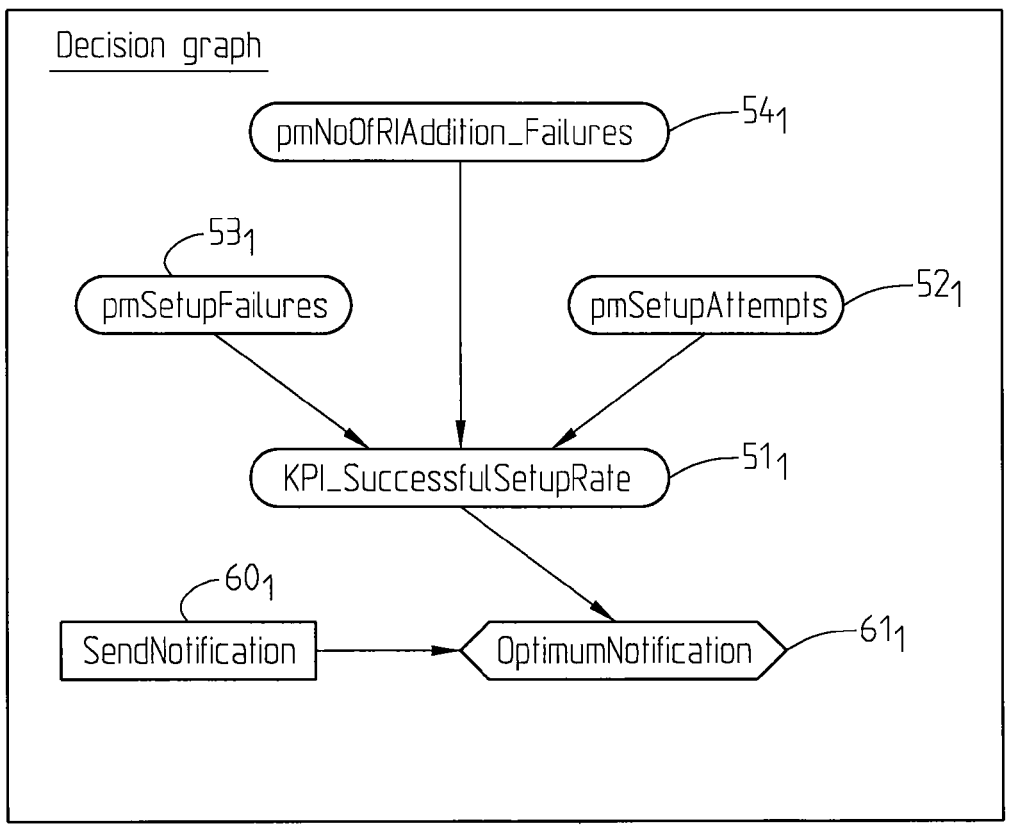
FIG. 2 shows a decision graph comprising an extended BN graph according to the present invention.

The invention will now be more thoroughly explained with reference to the drawings. With reference to FIG. 2 the encoding of a KPI in a Decision Graph according to the invention will be explained. As referred to above Decision Graphs are extended BNs including a qualitative evaluation of what values within the BN an outside entity, for example the network operator, may want to maximize. The decision graph contains the nodes of a Bayesian Network, cf. FIG. 1, but also two other node types, decision nodes encoding some decision that may be taken, for example to send an alarm or not to send an alarm, a notification etc., and utility nodes. Utility nodes specify when the decision would be optimum, i.e. indicate the quality of decisions. Utility node 61 here encodes the qualitative evaluation of what is a "good" KPI value and what is a "bad" KPI value, e.g. what is the threshold for a KPI violation. This value may be set by the operator. In FIG. 2 the utility node is illustrated as OptimumNotification 61, whereas the decision node is illustrated as SendNotification 60. The decision and utility nodes for a given KPI allow the operator to specify which actual or predicted value of a KPI will trigger a warning, which will trigger an alarm and which can simply be ignored. It should be clear that these merely constitute examples. FIG. 2 particularly shows the Decision Graph for the SuccessfulSetupRate KPI 51. Through the implementation of a Decision Graph according to the invention, it becomes possible to send notifications or more generally to take actions not only on the basis of actual evaluations, but also on the basis of predicted evaluations or predicted behaviour of some kind.

Figure 3:
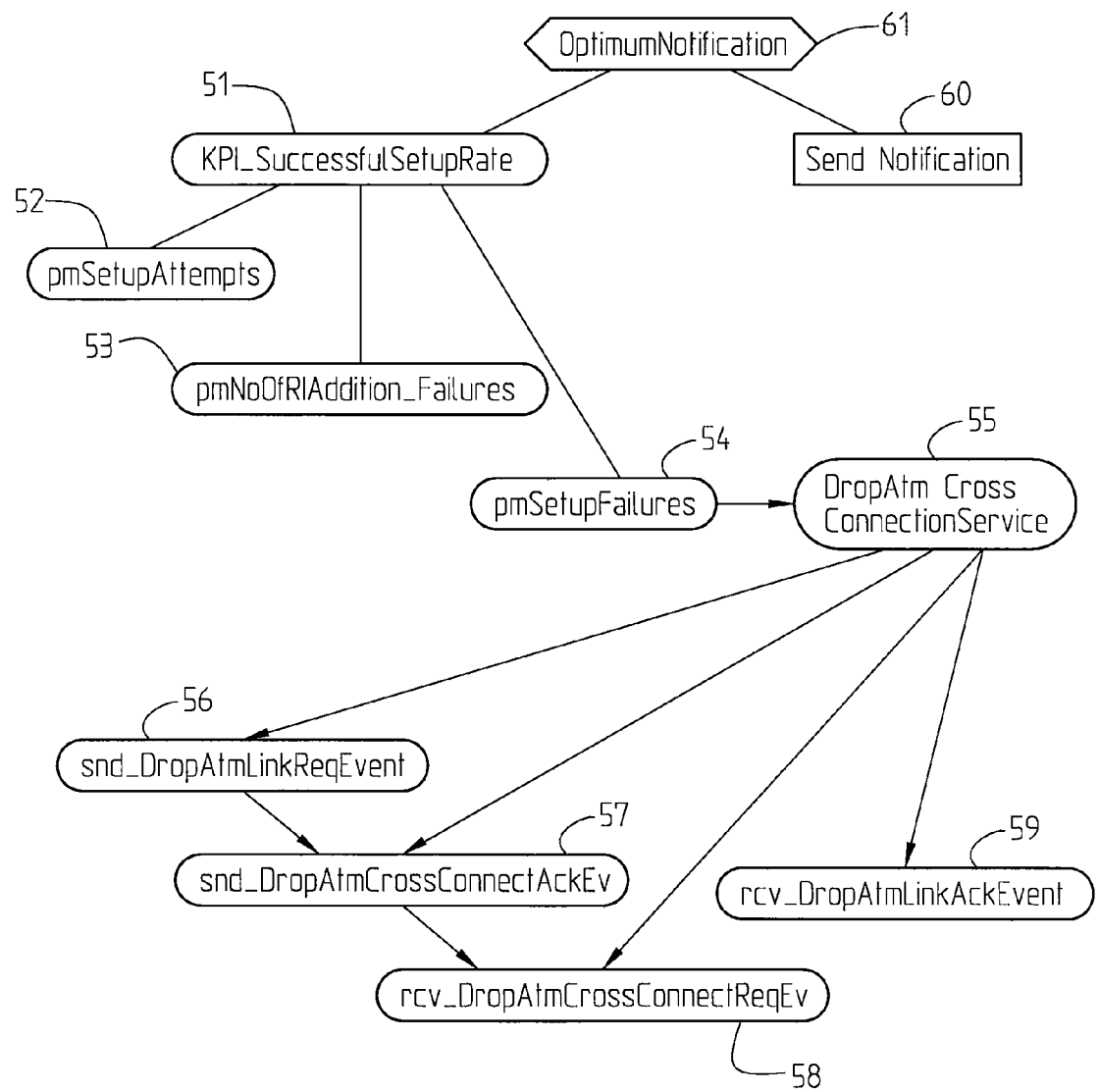
FIG. 3 shows another example of a decision graph according to the present invention further including configuration services.

FIG. 3 shows a "final Decision Graph" modelling a set of KPIs, alarms and configuration events etc. which are relevant for a given network device. The encoding of the Decision Graph as described here may in one embodiment be carried out by human experts. Alternatively it is built automatically from a knowledge source, for example an ontology model. The "final Decision Graph" here includes configuration services and KPI (here KPI_SuccessfulSetupRate) 51 with associated performance counters (here pmSetupAttempts 52, pmNoOffRiAdditionFailures 53 and pmSetupFailures 54), utility node OptimumNotification 61, notification decision node NotificationDecision 60 and the configuration service 56-59 DropAtmCrossConnectionService 55 with associated variables.

For monitoring the KPI for a network device, the Decision Graph model subscribes to performance parameters and other events of interest, i.e. all those encoded in the Decision Graph, on the network device (or entire network). This means that any change to a performance parameter automatically is updated in the Decision Graph model. The basic functionality of a BN ensures that each individual change propagates through the Decision Graph changing the probabilities of related variables in the graph. This means that a change to a performance parameter will result in a modification of the probabilities of the values of any associated KPIs. Over time these probability estimates will stabilize and they are fine-tuned by constant updates to performance parameters which constitute a consistent supply of evidence for incremental learning algorithms of the Decision Graph. This incremental learning process means that over time the Decision Graph will be able to make predictions about future behaviour on the basis of past experience. Normally these predictions become more accurate over time as the probability estimates are fine-tuned.

Through the introduction of the utility and decision nodes, it becomes possible to use the graph model to give advice on decisions. The values of particular Decision Graph parameters (variables) and values of particular decisions are linked to the qualitative evaluation of which combination of variables and decisions is optimum. This qualitative evaluation of decisions and network states is as referred to above encoded as a utility node. The different outcomes may be assigned utility values. One example of implementation of utility values is to assign utility values ranging from 0, indicating bad, to 1, indicating optimum.

Examples of decisions that may be taken are: to issue an alarm, to issue a warning, or not to issue any notification. The decision must be taken with respect to the actual or predicted values of a given KPI. The optimum outcome is to issue the correct kind of notification for the most probable value of the KPI. For example, a bad outcome would be to send an alarm when the KPI value is very unlikely to cross the violation threshold, even though it is close to that threshold. This outcome has a utility of 0. A good outcome would be to send a notification when the KPI is very likely to cross the violation threshold. This outcome would have a utility of 1 as it gives the operator time to pro-actively address the problems that could cause performance degradation. Given the expected utility of each decision in the context of the automatically updated current values of the KPI parameters, the software component housing the decision graph model, will issue an alarm or a notification, or nothing if appropriate.

In a particular embodiment of the present invention the Decision Graph is used to perform a sensitivity analysis for identifying how a variable depends on other variables, in particular to identify to which variable or variables it is most sensitive.

It can be used to identify contributing factors to KPI violations or near violations.

A sensitivity analysis can be carried out for a single parameter (variable) or node in the Decision Graph to the other variables in the graph. For a single variable, for example a single KPI, it is possible to test how the values vary with the set of other variables and thereby evaluate which other variables have the strongest influence on the KPI in question.

In another advantageous implementation of the invention, the sensitivity analysis can be performed and used in such a manner that the nodes in the Decision Graph which most influence the values of a KPI are identified. A Decision Graph subscribes to many network events such as performance counters of KPIs, alarms and configuration events as referred to above. The most obvious and well known correlation is that the value of a KPI depends on the values of the performance counters in the KPI formula. If however these primary influences on a KPI are disregarded it can established how other nodes influence a given KPI. In that manner the sensitivity analysis can be used to provide an automated root cause analysis tool for KPI violations. A sensitivity analysis can be used to determine which events, i.e. which other nodes in the decision graph, have the strongest influence on the KPI assuming a value above its violation threshold, or a predicted violation threshold linking a possible cause thereto. For example, an analysis can be used to identify that the packet drop rate is most susceptible to changes in the air interface even though the defined KPI formula is composed of other indicators or performance variables. It should be clear that this merely is one simple example, the main thing being that either it can be determined for each variable or node, how the other variables influence the KPI, or how any desired set of parameters (variables) affect certain parameters. In addition, as referred to above, it can be determined which additional performance parameters, or any desired group or set thereof, affect KPI, which is extremely advantageous.

Figure 4A:
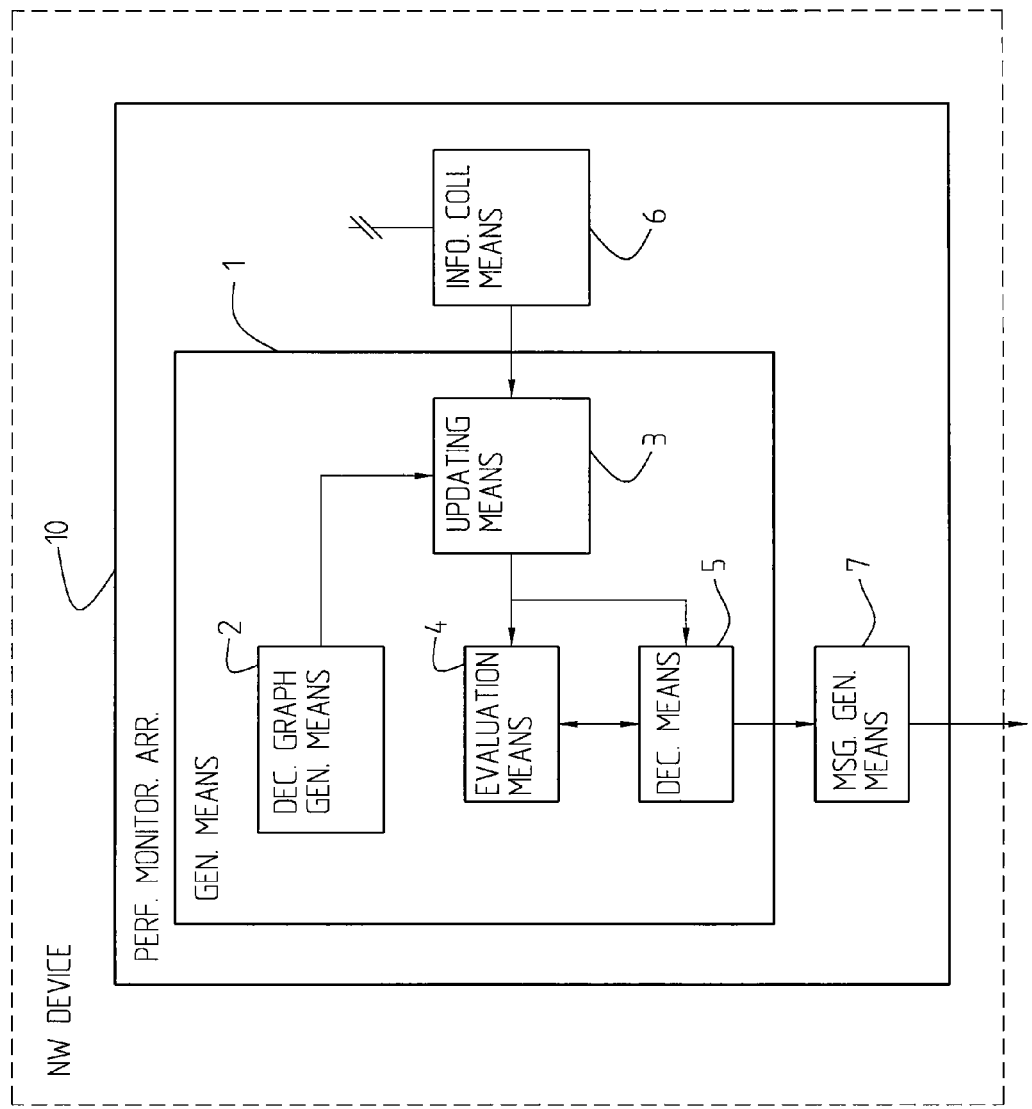
FIG. 4A shows a monitoring arrangement according to one embodiment of the present invention.

FIG. 4A shows a first embodiment of a performance monitoring arrangement 10 which, if implemented for local monitoring, may be provided in a network device illustrated as a dashed line. A network device may, for example, comprise a radio base station or a radio network controller or any other node. The generating means 1 here comprises decision graph generating means 2 adapted to, on site, generate the shape or structure of a decision graph. The decision graph has been described earlier. When implemented in the monitoring arrangement its content is updated by means of updating means 3, adapted to collect or receive information from information collecting means 6, which in any appropriate or conventional manner collect information relating to for example traffic events, user activities, management events, etc. The updating procedure in the decision graph has also been described earlier in the application. For each node or parameter value that is updated, all the other nodes or parameters are updated as well. Also the probabilities, i.e. what would be the likelihoods that certain parameters assume particular values depending on variation in other values are calculated and evaluation means 4 are adapted to evaluate or calculate utilities for combined probabilities for various decisions made in decision means 5. The monitoring arrangement also comprises message generating means 7 capable of generating messages or notifications when applicable, i.e. when a decision has been made to take some kind of action. The messages or notifications are then provided to the relevant means, for example the management system, which, however, does not form part of the present invention.

Figure 4B:
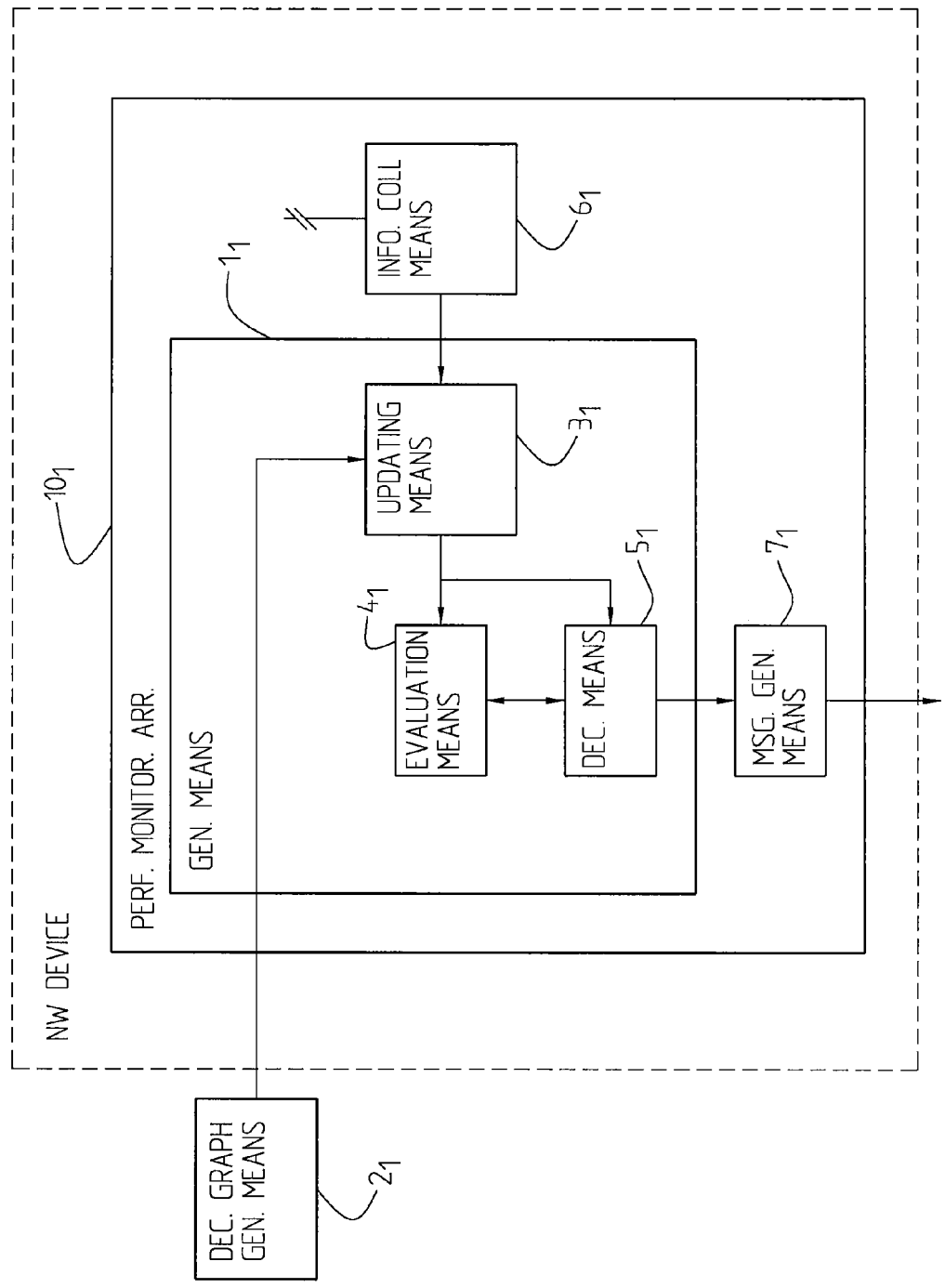
FIG. 4B shows a monitoring arrangement according to another embodiment of the present invention.

FIG. 4B shows an alternative implementation of a performance monitoring arrangement $10_1$ according to the present invention, which also may be located in a network device as illustrated with a dashed line. The performance monitoring arrangement $10_1$ comprises generating means $1_1$ which here communicate or are associated with decision graph generating means $2_1$. This means that the generating means $1_1$ may fetch or receive a pre-shaped or pre-structured decision graph from external means which, when installed in the monitoring arrangement, is updated by means of updating means $3_1$ collecting or receiving information from information collecting means $6_1$. Any relevant information can be collected. Evaluating means $4_1$ and decision means $5_1$ are as in FIG. 4A included in the generating means and communicate with message generating means $7_1$ also as in FIG. 4A. They will therefore not be further described here.

Figure 5:
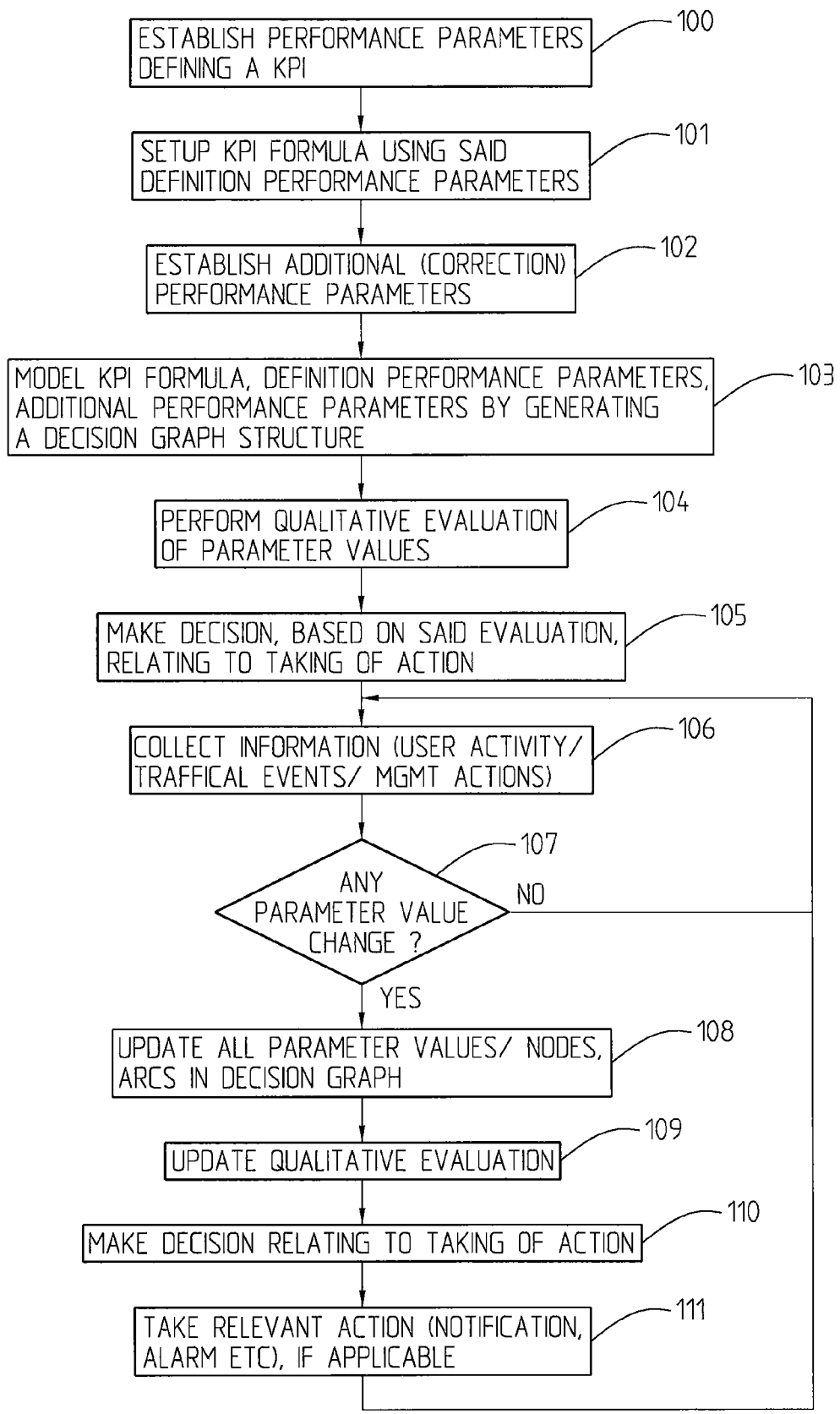
FIG. 5 shows a flow diagram describing one implementation of the present invention.

FIG. 5 is a flow diagram describing the procedure when the shape or structure of a decision graph is generated within the performance monitoring arrangement itself.

First, the performance parameters defining a KPI are established, 100, which means that the definition performance parameters that are of interest are established. A KPI formula is then set up using said definition performance parameters, 101. Further the additional or correlation performance parameters are established, 102. A KPI formula, definition performance parameters, and additional performance parameters are then modelled by generation of a decision graph structure, 103. A qualitative evaluation of the parameter values is performed, 104, (by means of a utility node in the decision graph). Decisions are made, based on said evaluation, relating to taking an action, for example sending a message or a notification or generating an alarm or not taking an action etc., 105. This procedure takes place continuously, intended to be illustrated by means of the loop in FIG. 5 incorporating steps 106-11 to be explained below. The way the figure has been drafted, it is supposed that in the steps 104, 105 the relevant information is up to date. Thus, information is collected continuously relating to user activities, traffic events, management events etc, 106. It is established continuously if there is a change in any parameter value, 107. If not, it is proceeded with collection of information. However, if there has been a change in one or more parameter values, all parameter values or nodes and arcs in the decision graph are updated, 108, and the qualitative evaluations are updated, 109. A decision relating to taking a particular action or not is made, 110. If it is decided to take an action, the relevant action is taken, 111. It should be borne in mind that the decision graph may comprise one, but also more or a plurality of KPIs.

Figure 6:
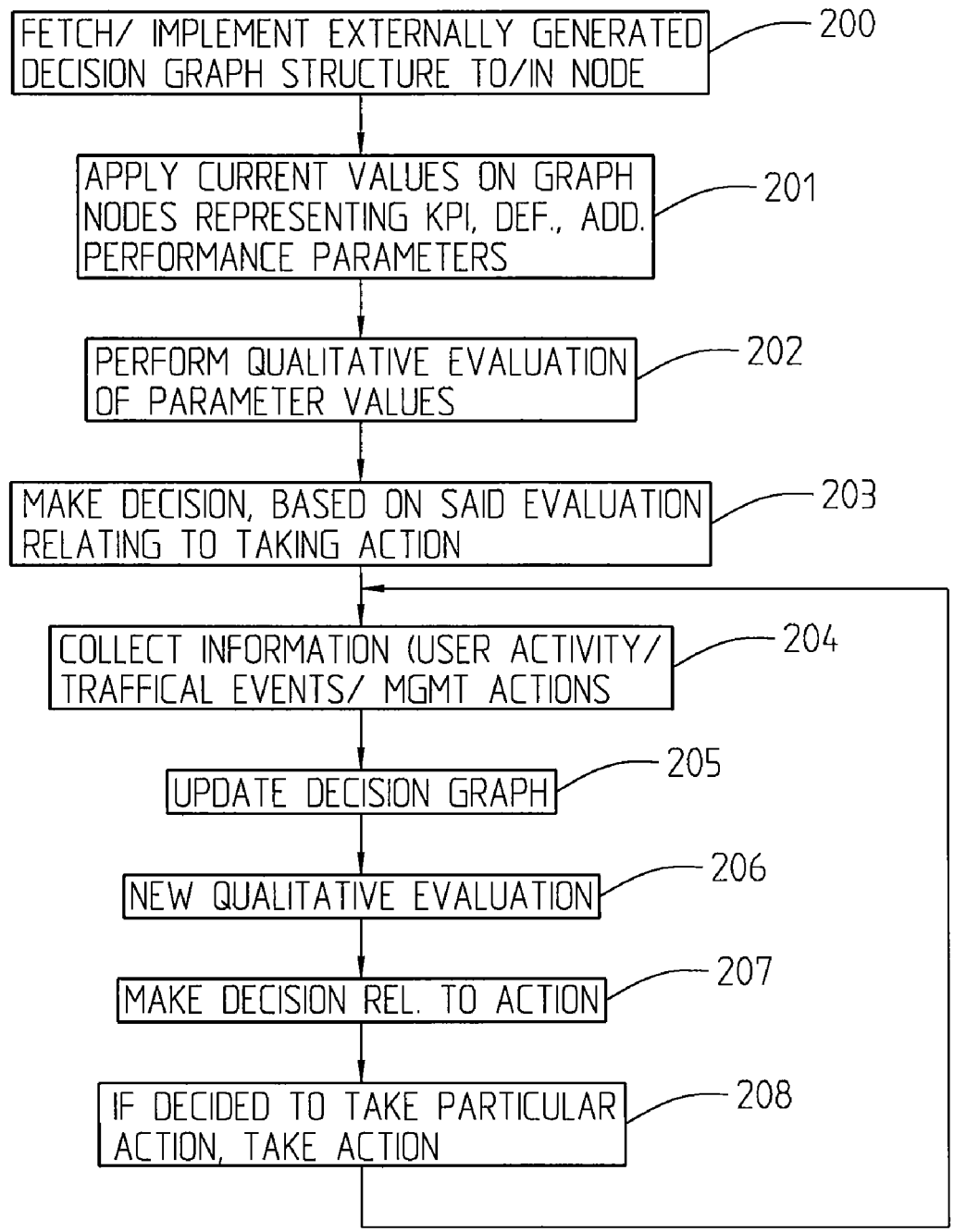
FIG. 6 shows a flow diagram of another implementation of the inventive concept.

FIG. 6 is a flow diagram similar to that of FIG. 5, but instead showing that the decision graph generating means are provided externally of the generating arrangement itself which is included in the monitoring arrangement in the sense that a pre-structured decision graph is installed therein. The main thing is that in some manner the structure or shape of the decision graph is installed in the arrangement. It is then irrelevant how, by what means and where the decision graph has been shaped, the main thing being that it is somehow installed for monitoring purposes. Thus, it is here supposed that a prefabricated decision graph structure is fetched or implemented in a monitoring arrangement provided in a network device, 200. The current values are applied in the graph nodes representing KPI, definition performance parameters and additional performance parameters 201. Qualitative evaluations of parameter values are performed, 202, and decisions are made, based on said evaluations relating to taking or not taking some action and, if applicable, which action, 203. Information is collected continuously, for example relating to user activities, traffic events, management actions etc, 204, and the decision graph is updated accordingly, 205. New qualitative evaluations based on the updated values are performed and appropriate decisions relating to actions etc. are made, 207. If it is decided to take a particular action, the action is taken, for example an alarm is generated or a message is sent out etc, 208. If it is decided not to take any action, the information collecting and updating procedures simply proceed.

According to the invention actions such as alarms and notifications can be triggered on the basis of predicted KPI evaluations. Since it becomes possible to take relevant actions at an early stage it can be avoided that problematic situations actually occur. It also becomes possible to correlate other events in the network with changes in the KPI levels. A particular advantage of the invention is that an automated sensitivity analysis of the causal structure and parameters of the decision graph as claimed, facilitates a root cause analysis of predicted or actual KPI violations. The qualitative evaluation comprises the linking of the values of particular decision graph variables and the values of particular decisions to a qualitative evaluation of which of the combinations of the variables and decisions, are optimum.

The invention thus provides an arrangement and a method enabling monitoring, predicting and analysing in real-time in-service performance of a network or a network device as evidenced by key performance indicators based on performance counters and other events in a communications network using Decision Graphs, for example a telecommunications or data communications network. On network node (device) level the arrangement can be implemented in the appropriate network node to be managed and hence monitored, for example in base stations in an access network, or even core network nodes or other types of nodes to be monitored and managed.

Alarms and notifications can be triggered on the basis of predicted KPI violations which allows the operator to proactively address any problems in the network.

Other events in the network can be correlated with changes in KPI levels and it is possible to perform an automated sensitivity analysis of the causal structure and parameters of the Decision Graph which facilitates a root cause analysis of predicted or actual KPI violations.

The invention claimed is:

1. A method for real-time monitoring a network comprising a number of network devices, or network nodes, services and users, wherein the method comprises the steps of:
   providing one or more Key Performance Indicators (KPI) in dependence of KPI definition performance parameters and additional or correlation parameters in a decision graph representing KPI values and combination probabilities by:
   collecting performance counters which provide a formula defining KPI,
   using BN technology to directly encode the formula in the decision graph by:
   representing the KPI by means of a KPI node in the graph,
   representing the KPI definition performance parameters as nodes in the decision graph,
   linking the KPI node to the performance counters by means of arcs or links, said links representing a causal relationship between changes to performance counters and to the KPI,
   representing decisions relating to taking of actions as a number of notification decision nodes,
   evaluating, qualitatively the combination of a value of a variable performance parameter and a decision value to provide a utility value, and
   encoding the utility value in a utility node,
   updating, automatically, the KPI values and performance probabilities when there is a change in any definition performance parameter and/or in any additional or correlation parameter so that the KPI values and combination probabilities always are up-to-date,
   using the decision graph to predict KPI values and/or performance parameters at a single point in time and/or their variation over a given time interval.

2. A method according to claim 1, wherein the method comprises the step of:
   storing the decision graph.

3. A method according to claim 1 wherein the providing step comprises:
   implementing a pre-shaped or externally generated decision graph structure.

4. A method according to claim 1 wherein the providing step comprises:
   generating the decision graph structure internally.

5. A method according to claim 1, wherein the method comprises the steps of:
   performing a sensitivity analysis for a performance parameter, represented as a node by:
   varying, one by one, the other performance parameters comprising definition performance and additional performance parameters.

6. A method according to claim 1, wherein the method comprises the step of:
   performing a KPI root cause analysis by,
   varying the additional or correlation performance parameters,
   establishing the corresponding obtained utility values.

* * * * *

UNITED STATES PATENT AND TRADEMARK OFFICE
CERTIFICATE OF CORRECTION

PATENT NO.         : 8,255,524 B2                                            Page 1 of 1
APPLICATION NO.    : 12/530161
DATED              : August 28, 2012
INVENTOR(S)        : Devitt It is certified that error appears in the above-identified patent and that said Letters Patent is hereby corrected as shown below:

In Column 5, Line 59, delete "KPIS." and insert -- KPIs. --, therefor.

In Column 7, Line 15, delete "510" and insert -- $51_0$ --, therefor.

In Column 7, Line 16, delete "550, 530, 540" and insert -- $55_0$, $53_0$, $54_0$ --, therefor.

In Column 7, Line 22, delete "510" and insert -- $51_0$ --, therefor.

In Column 7, Line 23, delete "520," and insert -- $52_0$, --, therefor.

In Column 7, Line 23, delete "530" and insert -- $53_0$ --, therefor.

In Column 7, Line 24, delete "540" and insert -- $54_0$ --, therefor.

In Column 7, Line 25, delete "510" and insert -- $51_0$ --, therefor.

In Column 8, Line 3, delete "61" and insert -- $61_1$ --, therefor.

In Column 8, Line 7, delete "61," and insert -- $61_1$, --, therefor.

In Column 8, Line 8, delete "60." and insert -- $60_1$. --, therefor.

In Column 8, Line 14, delete "51." and insert -- $51_1$. --, therefor.

In Column 10, Line 52, delete "106-11" and insert -- 106-111 --, therefor.

Signed and Sealed this
Fifth Day of February, 2013

Teresa Stanek Rea
*Acting Director of the United States Patent and Trademark Office*